(12) United States Patent
Chang

(10) Patent No.: US 10,483,827 B2
(45) Date of Patent: Nov. 19, 2019

(54) BUILT-IN CAPACITOR MOTOR STRUCTURE

(71) Applicant: Sagitta Industrial Corp., Taipei (TW)

(72) Inventor: Fang-Fu Chang, Taipei (TW)

(73) Assignee: Sagitta Industrial Corp., Taipei (TW)

( * ) Notice: Subject to any disclaimer, the term of this patent is extended or adjusted under 35 U.S.C. 154(b) by 507 days.

(21) Appl. No.: 15/294,816

(22) Filed: Oct. 17, 2016

(65) Prior Publication Data

US 2017/0288508 A1 Oct. 5, 2017

(30) Foreign Application Priority Data

Apr. 1, 2016 (TW) .............................. 105110623 A

(51) Int. Cl.
| | |
|---|---|
| *H02K 11/02* | (2016.01) |
| *H02K 5/22* | (2006.01) |
| *H02K 17/08* | (2006.01) |
| *H02K 11/00* | (2016.01) |
| *H02K 1/12* | (2006.01) |
| *H02K 3/52* | (2006.01) |
| *H02K 17/30* | (2006.01) |

(52) U.S. Cl.
CPC ........... *H02K 11/0094* (2013.01); *H02K 1/12* (2013.01); *H02K 3/522* (2013.01); *H02K 17/30* (2013.01)

(58) Field of Classification Search
CPC .... H02K 11/00; H02K 11/0094; H02K 11/01; H02K 11/02; H02K 11/022; H02K 11/024; H02K 5/00; H02K 5/22; H02K 1/12; H02K 3/522; H02K 3/52; H02K 3/34; H02K 17/30; H02K 17/08
See application file for complete search history.

(56) References Cited

U.S. PATENT DOCUMENTS 3,048,722 A * 8/1962 Baron .................. H02K 11/024
310/238
4,649,305 A * 3/1987 Morrill .................. H02K 17/30
310/269
(Continued)

FOREIGN PATENT DOCUMENTS

FR 2428937 A1 * 1/1980 ............. H02K 17/08
JP 2002051513 A * 2/2002

*Primary Examiner* — Edgardo San Martin
(74) *Attorney, Agent, or Firm* — Alan D. Kamrath; Mayer & Williams PC

(57) ABSTRACT

An improved built-in capacitor motor structure includes a housing, a stator portion, an insulating member and a rotor portion. The housing includes a front cover and a rear cover for receiving the stator portion. The stator portion includes a core frame provided with an annular insulating frame body to which the insulating member connects. A plurality of circularly arranged docking units extend from the periphery of one side of the insulating frame body. A plurality of corresponding docking units are provided at the bottom side edge of the insulating member. These corresponding docking units are engaged with the docking units of the insulating frame body, respectively. The rotor portion is received in the stator portion. A capacitor is combined inside an accommodating space of the insulating member in communication with the outside, such that the capacitor is assembled inside the motor. In this way, assembly is easy while electromagnetic field of the motor is less easily affected.

7 Claims, 5 Drawing Sheets

(56) References Cited

U.S. PATENT DOCUMENTS

| | | | | |
|---|---|---|---|---|
| 5,194,775 A * | 3/1993 | Cooper | ............... | H02K 3/522 |
| | | | | 310/216.005 |
| 5,548,169 A * | 8/1996 | Iwasa | ............... | H02K 17/30 |
| | | | | 310/68 R |
| 6,057,615 A * | 5/2000 | Long | ............... | H02K 17/30 |
| | | | | 248/227.3 |
| 6,191,506 B1 * | 2/2001 | Wright | ............... | H02K 29/08 |
| | | | | 29/598 |
| 6,229,236 B1 * | 5/2001 | Fisher | ............... | H02K 17/08 |
| | | | | 248/231.81 |
| 6,717,307 B2 * | 4/2004 | Dreher | ............... | H02K 17/30 |
| | | | | 310/68 R |
| 6,975,052 B2 * | 12/2005 | Uchida | ............... | H02K 3/522 |
| | | | | 310/71 |
| 7,132,769 B2 * | 11/2006 | Uchida | ............... | H02K 3/522 |
| | | | | 310/72 |
| 7,291,949 B2 * | 11/2007 | Liu | ............... | H02K 5/22 |
| | | | | 310/67 R |
| 7,332,840 B2 * | 2/2008 | Ku | ............... | H02K 3/522 |
| | | | | 310/194 |
| 8,299,664 B2 * | 10/2012 | Iwai | ............... | H01L 23/3107 |
| | | | | 310/64 |

\* cited by examiner

BUILT-IN CAPACITOR MOTOR STRUCTURE

BACKGROUND OF THE INVENTION

1. Field of the Invention

The invention relates to an improved built-in capacitor motor structure, and more particularly, to an improved built-in capacitor motor structure in which the capacitor can be assembled inside the motor with ease and in such a way that it will not easily interfere with the electromagnetic field of the motor.

2. Description of the Prior Art

Capacitor-run single-phase induction motor, according to their characteristics, needs to be connected to a capacitor that is generally provided on the surface of the motor housing. The capacitor is thus directly affected by dust, moisture, oxidation, or the like, which may result in damage and/or cracking in the capacitor, as well as internal expansion or electrolytic deterioration of the capacitor.

Therefore, some manufacturers have developed a structure in which the capacitor is placed inside the motor. As seen in FIG. 1, a perspective exploded view of a conventional capacitor motor structure includes a motor 1 having two housings 11. These housings 11 are provided with a core frame 12 with a plurality of coils (i.e. windings) wound onto it. The coils 13 are arranged annularly around the core frame and separated from each other at an interval. A curved circuit board 14 has a plurality of capacitors 15 vertically disposed thereon and are correspondingly arranged at said interval, such that the capacitors 15 are inserted between the coils 13 until the curved circuit board 14 sits on top of the core frame 12. Although the above structure allows the capacitors 15 to be provided inside the motor 1, the electromagnetic field generated during operation of the motor 1 is interfered by the electromagnetic field generated by the capacitors 15. Since based on the principle of electromagnetic, the motor 1 when in operation will generate an electromagnetic field, this electromagnetic field surrounds the coils 13, and the capacitors 15 are energy-storing elements and will generate an electromagnetic field when a voltage is applied. This causes the motor 1 to loss excess electromagnetic energy. Although the effectiveness of the operation of the motor 1 may not be greatly affected, but the electromagnetic energy consumption is relatively increased. Furthermore, these capacitors 15 contain energy-storing conductive materials such as electrolyte storage, and the coils 13 are made of a metal material (e.g. copper), stray capacitance may be created due to the close proximity of the coils 13 and the capacitors 15, causing excess electromagnetic energy loss of the motor. In addition, during operation of the motor 1, heat is often generated. The spaces between the coils 13 are occupied by the capacitors 15, resulting in poor heat dissipation. The heat built up from continuous long-term operation may easily lead to deterioration of the electrolyte in the capacitors 15, or even expansion or cracking of the capacitors 15, causing damage to the motor 1. Furthermore, different fill rates of the winding slots can also cause difficulties on the practical implementation. When the power of the motor 1 is increased, the size of the coils 13 also increases, but at the same time, the capacitance needed also increases. However, the larger the coils 13, the smaller the spacing between the coils 13, thus it becomes increasingly more difficult to place the capacitors 15 between the coils 13. This has led to considerable difficulties in practical implementation.

In view of the shortcomings in the prior art, the present invention is proposed to provide improvements that address these shortcomings.

SUMMARY OF THE INVENTION

One main objective of the present invention is to provide an improved built-in capacitor motor structure in which the capacitor can be assembled inside the motor with ease and in such a way that it will not easily interfere with the electromagnetic field of the motor.

In order to achieve the above objectives and effects, the technical means employed by the present invention may include: a housing including a front cover and a rear cover; a stator portion received in the housing; an insulating member combined with the stator portion; and a rotor portion received in the stator portion, wherein the stator portion includes a core frame with an annular insulating frame body provided thereon, a plurality of circularly arranged docking units extending from the periphery of a side of the insulating frame body; a plurality of corresponding docking units being provided at the bottom side edge of the insulating member, the plurality of corresponding docking units are engaged with the docking units of the insulating frame body, respectively, to connect the insulating member on the insulating frame body.

Based on the above structure, a capacitor is combined inside the accommodating space of the insulating member.

Based on the above structure, the plurality of docking units of the insulating frame body extend towards the front cover, and the insulating member is disposed on the insulating frame body and positioned between the front cover and the stator portion.

Based on the above structure, wherein the plurality of docking units of the insulating frame body extend towards the rear cover, and the insulating member is disposed on the insulating frame body and positioned between the rear cover and the stator portion.

Based on the above structure, one or more elastic buckles are provided on a wall of the insulating member.

Based on the above structure, there are a plurality of insulating members spaced at an angle to one another.

The objectives, effects and features of the present invention can be more fully understood by referring to the drawing as follows:

DETAILED DESCRIPTION OF THE PREFERRED EMBODIMENTS

Figure 1:
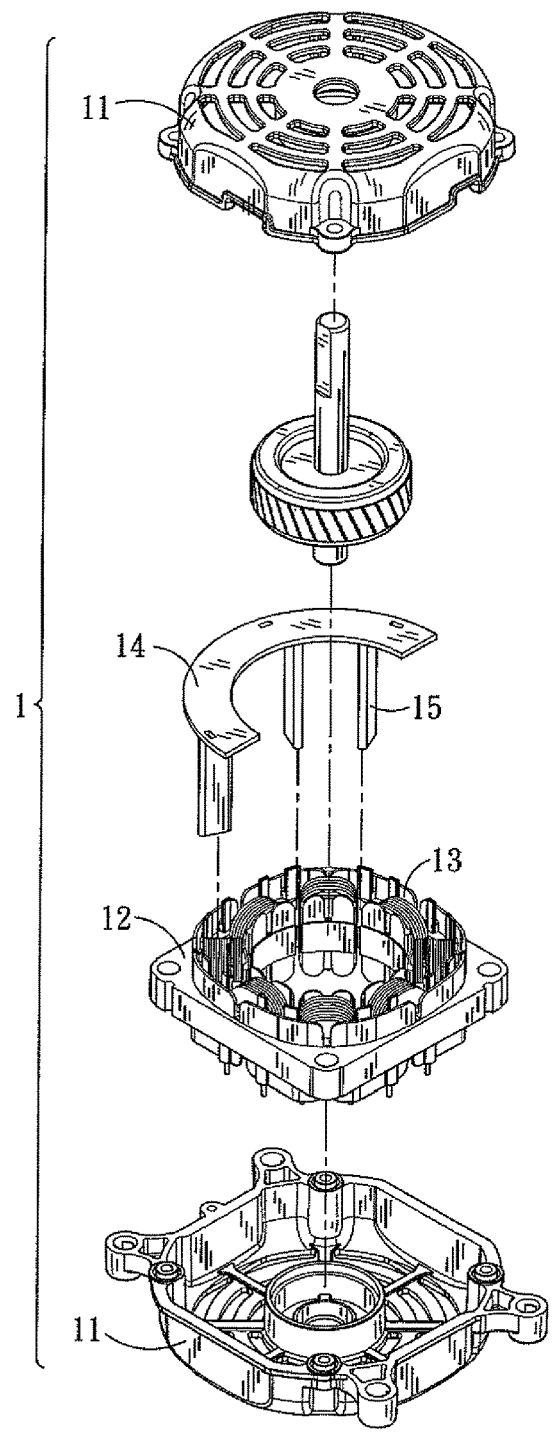
FIG. 1 is a perspective exploded view of a conventional capacitor motor structure.
Figure 2:
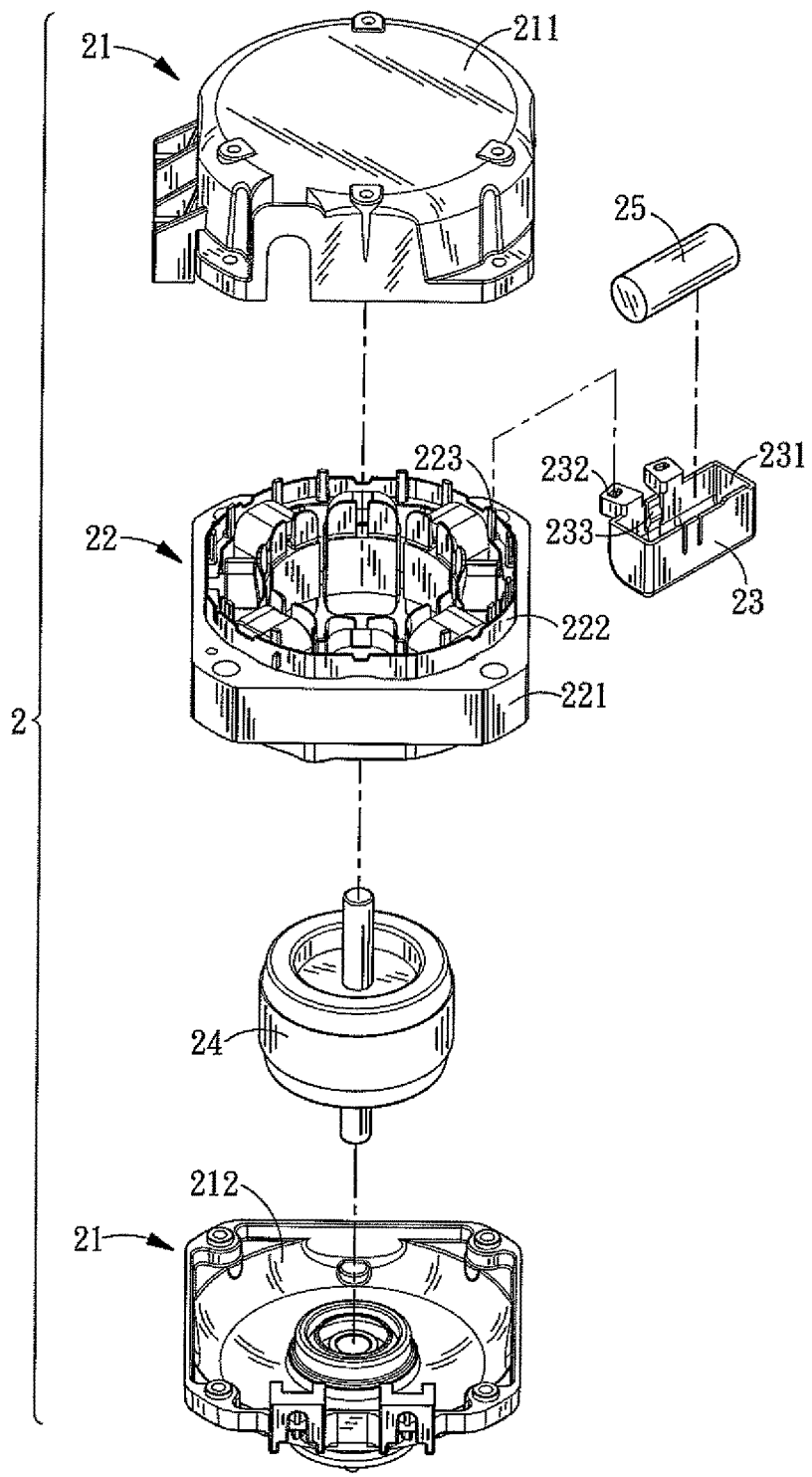
FIG. 2 is a perspective exploded view of the structure of the present invention.
Figure 3:
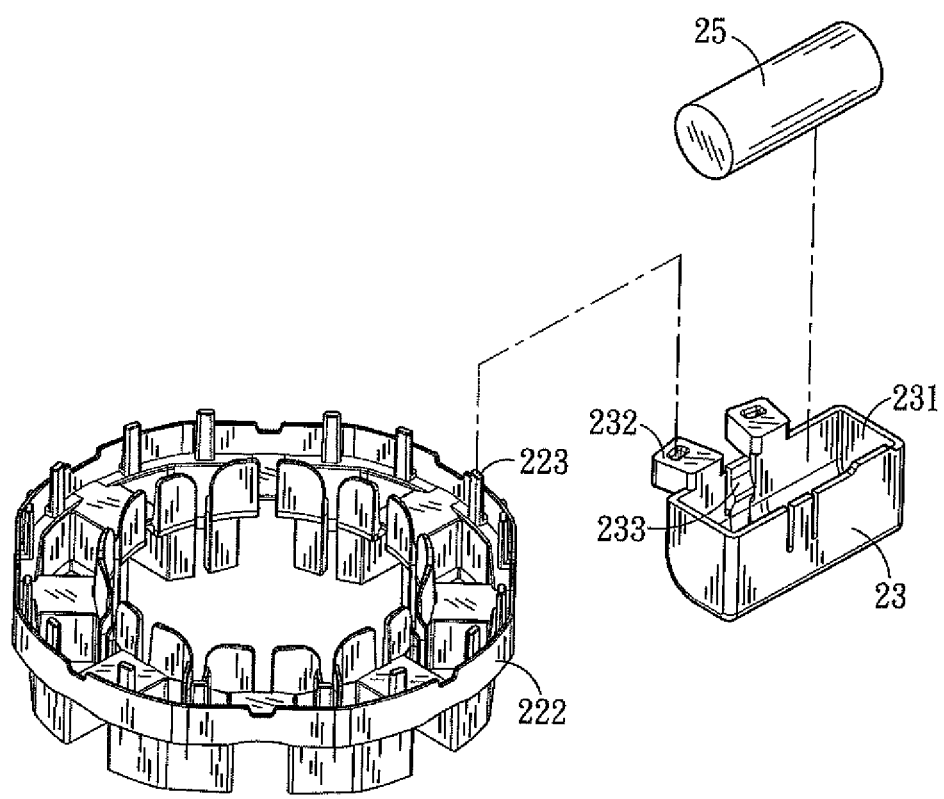
FIG. 3 is a perspective exploded view of part of the structure of the present invention.

Referring to FIGS. 2 and 3, a perspective exploded view of the structure of the present invention and a perspective exploded view of part of the structure of the present invention are shown. A motor structure 2 of the present invention includes: a housing 21, a stator portion 22, an insulating member 23 and a rotor portion 24, wherein the housing 21 includes a front cover 211 and a rear cover 212, a space formed between the front cover 211 and the rear cover 212 accommodates the stator portion 22, the insulating member 23 and the rotor portion 24.

The stator portion 22 having a core frame 221 is disposed within the housing 21. The core frame 221 has an insulating frame body 222 thereon. A plurality of docking units 223 extend from the periphery of one side of the insulating frame body 222. It should be noted that based on the structure of the core frame 221, the insulating frame body 222 is provided in a circle around the inside of the core frame 221. Therefore, the docking units 223 extending from the insulating frame body 222 are arranged in a circle at a certain interval.

The insulating member 23 includes an accommodating space 231 in communication with the outside. A capacitor 25 is combined in the accommodating space 231. Combining the capacitor 25 means assembling the capacitor 25 and the insulating member 23 together. In the diagram of this embodiment, it is represented by inserting (equivalent terms such as placing, putting, wedging or the like) the capacitor 25 into the insulating member 23. However, any means for combining (equivalent terms such as connecting, linking, assembling, disposing or the like) the capacitor 25 inside the insulating member 23 and are applicable to the motor 2 should be considered as within the scope of the present invention.

The specific combination techniques, in addition to insertion above, include bonding via adhesive material (e.g. hot melt adhesive, glue, PU glue, latex, epoxy adhesive, handling agents, hardening agents, finishing agents, AB glue, etc.), or mechanical fastening (e.g. riveting, screw locking, buckling, quick release, etc.), and these should remain within the scope of the present invention. A plurality of corresponding docking units 232 are provided at a side edge of bottom of the insulating member 23, such that when the insulating member 23 is mounted on the stator portion 22, the corresponding docking units 232 match with the docking units 223 on the insulating frame body 222, respectively. It should be noted that one or more elastic buckle(s) 233 can be provided on the wall of the insulating member 23 for further securing the capacitor 25 in the insulating member 23.

The rotor portion 24 is housed within, the stator portion 22.

When assembled, the stator portion 22 includes a core frame 221 having an annular insulating frame body 222. A plurality of circularly arranged docking units 223 extend from the periphery of one side of the insulating frame body 222. A plurality of corresponding docking units 232 are provided at a side edge of the bottom of the accommodating space 231, wherein the corresponding docking units 232 are engaged with the docking units 223 of the insulating frame body 222, respectively, such that the insulating member 23 is connected onto the insulating frame body 222.

It should be noted that in the paragraph above, it is mentioned that the plurality of docking units 223 extend from the periphery of one side of the insulating frame body 222, "one side" herein means a side of the insulating frame body 222 facing the front cover 211 or the rear cover 212. In other words, when the docking units 223 of the insulating frame body 222 extend towards the front cover 211, then the insulating member 23 is connected at the front of the insulating frame body 222, that is, between the front cover 211 and the stator portion 22; on the other hand, when the docking units 223 of the insulating frame body 222 extend towards the rear cover 212, then the insulating member 23 is connected at the rear of the insulating frame body 222, that is, between the rear cover 212 and the stator portion 22. Thus, the docking units 223 of the present invention can be manufactured at one side or both sides of the insulating frame body 222 according to needs. When the docking units 223 extend from both sides of the insulating frame body 222, then one, two or more of the insulating members 23 can be connected with the insulating frame body 222.

In this way, the motor 2 allows the capacitor(s) 25 to be provided inside the housing 21. Meanwhile, when the capacitor 25 is provided inside the motor 2, the position of the capacitor 25 is parallel to that of the stator portion 22. As a result, the electromagnetic field generated when the motor 2 is in operation will not be easily interfered by that of the capacitor 25. Furthermore, the capacitor 25 is first inserted in the insulating member 23 and then assembled onto the insulating frame body 222 of the stator portion 22. This method has the advantage of easy and quick assembly. Moreover, only a single capacitor 25 is required for different-sized motors 2. Compared to the prior art where a plurality of small capacitors 15 are required, the present invention is more cost effective and easy to maintain.

Figure 4:
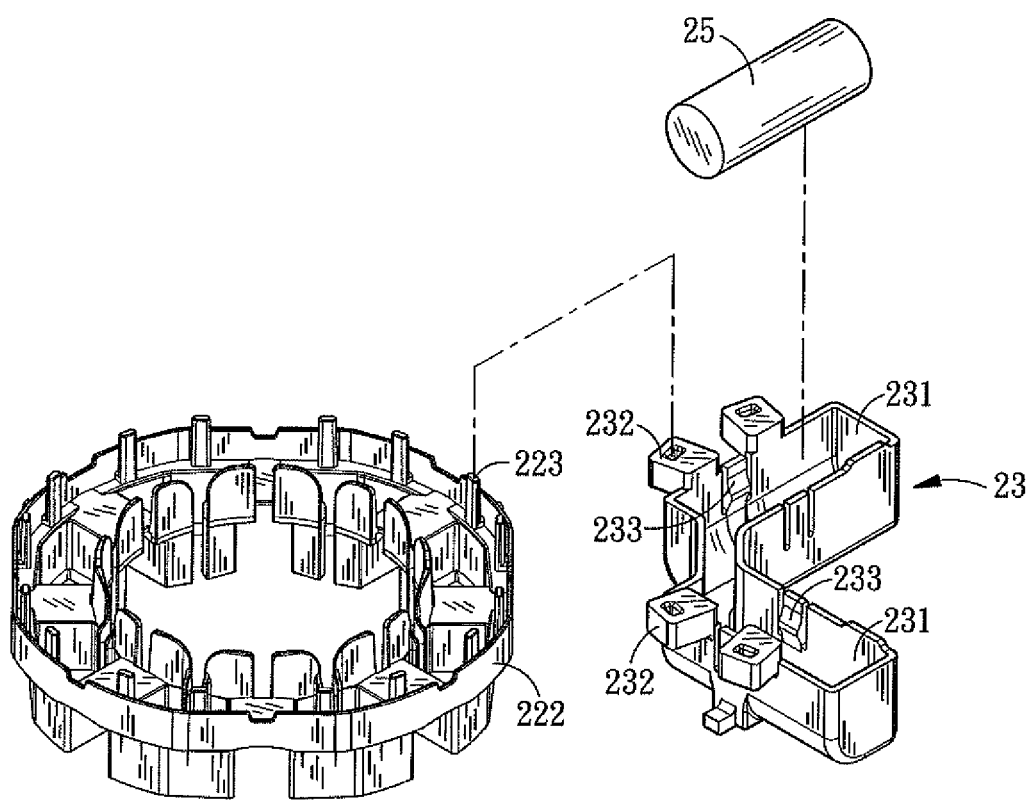
FIG. 4 is a perspective exploded view of part of the structure in accordance with another preferred embodiment of the present invention.

Referring to FIG. 4, a perspective exploded view of part of the structure in accordance with another preferred embodiment of the present invention is shown. In actual use of the present invention, according to actual needs, a plurality of insulating members 23 can be mounted on the insulating frame body 222. In order to accommodate the annular shape of the insulating frame body 222, there can be an angle difference between the insulating members 23. In the diagram illustrating this embodiment, there are two insulating members 23 arranged in a curve, and they can also be placed in parallel on the insulating frame body 222. When there are three or more of the insulating member 23, they can be arranged in multiple curves. It should be noted that, the insulating members 23 can be connected to each other before connecting to the insulating frame body 222, or they can be separately connected to the insulating frame body 222. In this embodiment, the insulating members 23 are connected beforehand, but the insulating members 23 that are independently provided on the insulating frame body 222 are also within the scope of the present invention.

Figure 5:
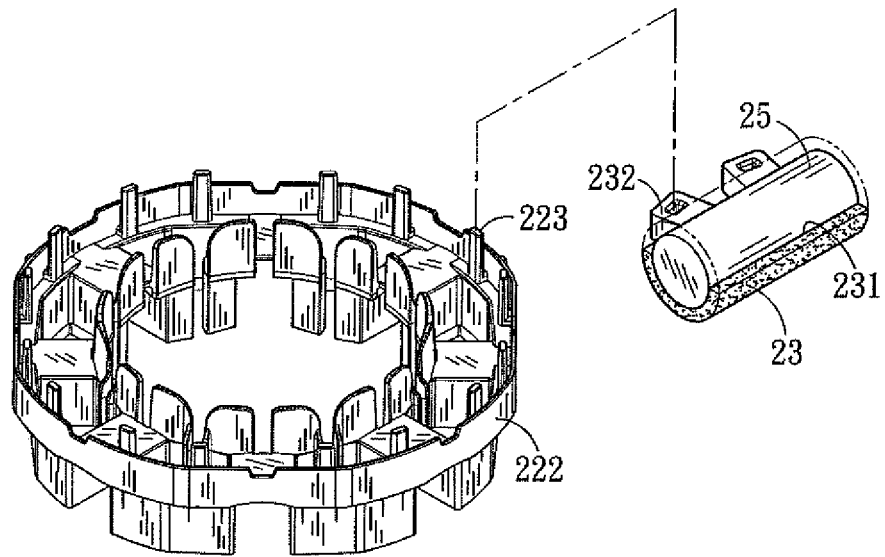
FIG. 5 is a perspective exploded view of part of the structure in accordance with still another preferred embodiment of the present invention.

Referring to FIG. 5, a perspective exploded view of part of the structure in accordance with still another preferred embodiment of the present invention is shown. This embodiment is different from the previous embodiments in that the insulating member 23 is integrally formed/combined on the outside of the capacitor 25. Some implementations are explained as follow. For example, a liquid, soft or flexible adhesive (e.g. curing adhesive) is coated or adhered on part or all of the surface of the capacitor 25. The curing adhesive is one that is liquid, soft or flexible before coated or adhered on the capacitor 25 and becomes the insulating member 23 integrally formed on the outside of the capacitor 25 after the curing process, such as light curing (exposed to light of certain wavelengths, e.g. UV light). Alternatively, the adhesive can be thermoplastic (soft or liquid when hot and solidified when cooled, e.g. hot melt adhesive) or volatile (e.g. cured after volatilization of certain gases, such as AB gel or epoxy putty). Accordingly, any means for assembling the capacitor 25 inside the motor 2 without interfering the stator or the rotor are deemed to be within the scope of the present invention.

Figure 6:
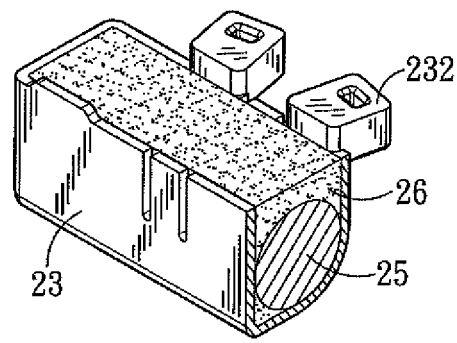
FIG. 6 is a perspective cross-sectional view of part of the structure in accordance with yet another preferred embodiment of the present invention.

Referring to FIG. 6, a perspective cross-sectional view of part of the structure in accordance with yet another preferred embodiment of the present invention is shown. This embodiment is different from the previous embodiments in that after the capacitor 25 is inserted into the insulating member 23, an adhesive 26 is further filled in the gap between the insulating member 23 and the capacitor 25. Since vibration and electromagnetic field are produced when the motor is in operation, with the use of the adhesive 26, the capacitor 25 can be firmly held inside the insulating member 23. When the ingredients of the adhesive 26 contain electromagnetic-shielding additives, the effect of electromagnetic shielding between the capacitor 25 and the motor 2 can be enhanced.

In view of this, the improved built-in capacitor motor structure of the present invention allows the electromagnetic field to be less easily interfered by the capacitor, and thus is submitted to be novel and non-obvious and a patent application is hereby filed in accordance with the patent law. It should be noted that the descriptions given above are merely descriptions of preferred embodiments of the present invention, various changes, modifications, variations or equivalents can be made to the invention without departing from the scope or spirit of the invention. It is intended that all such changes, modifications and variations fall within the scope of the following appended claims and their equivalents.

What is claimed is:

1. An improved built-in capacitor motor structure comprising:
   a housing including a front cover and a rear cover;
   a stator portion received in the housing including a core frame, the core frame is provided with an annular insulating frame body, a plurality of circularly arranged docking units extending from the periphery of a side of the insulating frame body;
   an insulating member connected on the insulating frame body having an accommodating space in communication with the outside, a capacitor being combined inside the accommodating space of the insulating member, and a plurality of corresponding docking units being provided at the bottom side edge of the insulating member; and
   a rotor portion received in the stator portion,
   wherein the plurality of corresponding docking units are engaged with the docking units of the insulating frame body, respectively, to connect the insulating member on the insulating frame body.

2. The improved built-in capacitor motor structure of claim 1, wherein the plurality of docking units of the insulating frame body extend towards the front cover, and the insulating member is disposed on the insulating frame body and positioned between the front cover and the stator portion.

3. The improved built-in capacitor motor structure of claim 1, wherein the plurality of docking units of the insulating frame body extend towards the rear cover, and the insulating member is disposed on the insulating frame body and positioned between the rear cover and the stator portion.

4. The improved built-in capacitor motor structure of claim 1, wherein one or more elastic buckles are provided on a wall of the insulating member.

5. The improved built-in capacitor motor structure of claim 1, wherein there are a plurality of insulating members spaced at an angle to one another.

6. The improved built-in capacitor motor structure of claim 1, wherein the insulating member is integrally formed on the outside of the capacitor.

7. The improved built-in capacitor motor structure of claim 1, wherein the insulating member covers part or all of the outside of the capacitor.

* * * * *